United States Patent
Seo et al.

(10) Patent No.: US 9,054,930 B2
(45) Date of Patent: Jun. 9, 2015

(54) METHOD FOR PERFORMING WIRELESS COMMUNICATION BETWEEN USER EQUIPMENT AND BASE STATION IN A WIRELESS COMMUNICATION SYSTEM SUPPORTING FIRST USER EQUIPMENT USING SINGLE FREQUENCY BAND AND SECOND USER EQUIPMENT USING MULTIPLE FREQUENCY BANDS

(75) Inventors: Dong Youn Seo, Anyang-si (KR); Jae Hoon Chung, Anyang-si (KR); Yeong Hyeon Kwon, Anyang-si (KR); Dae Won Lee, Anyang-si (KR); Ki Jun Kim, Anyang-si (KR); Seung Hee Han, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 339 days.

(21) Appl. No.: 13/143,293

(22) PCT Filed: Jan. 4, 2010

(86) PCT No.: PCT/KR2010/000016
§ 371 (c)(1),
(2), (4) Date: Sep. 27, 2011

(87) PCT Pub. No.: WO2010/077118
PCT Pub. Date: Jul. 8, 2010

(65) Prior Publication Data
US 2012/0269136 A1 Oct. 25, 2012

Related U.S. Application Data

(60) Provisional application No. 61/142,372, filed on Jan. 4, 2009, provisional application No. 61/143,144, filed on Jan. 7, 2009.

(30) Foreign Application Priority Data

Dec. 22, 2009 (KR) .......................... 10-2009-0128844

(51) Int. Cl.
*H04L 27/26* (2006.01)
*H04L 5/00* (2006.01)
*H04B 1/713* (2011.01)

(52) U.S. Cl.
CPC .......... *H04L 27/2621* (2013.01); *H04L 5/0037* (2013.01); *H04B 1/713* (2013.01); *H04L 5/001* (2013.01)

(58) Field of Classification Search
None
See application file for complete search history.

(56) References Cited

U.S. PATENT DOCUMENTS

| 8,289,935 B2 * | 10/2012 | Frederiksen et al. ......... 370/337 |
| 2006/0098752 A1 | 5/2006 | Song et al. |
| 2007/0165584 A1 * | 7/2007 | Ponnampalam et al. ..... 370/338 |

(Continued)

*Primary Examiner* — Jason Mattis
(74) *Attorney, Agent, or Firm* — Birch, Stewart, Kolasch & Birch, LLP

(57) ABSTRACT

A method for performing a wireless communication between a UE and a BS in a wireless communication system supporting a first UE using a single frequency band and a second UE using a plurality of frequency bands, to each of which OFDM is applied, is disclosed. The method includes being allocated one or more downlink component carriers for the second UE from the BS, and receiving the one or more downlink component carriers from the BS by the second UE. The one or more downlink component carriers are cyclically shifted by different cyclic shift values and the cyclic shifting is performed by multiplying each of the one or more downlink component carriers by a linear phase having a different inclination.

8 Claims, 11 Drawing Sheets

(56) References Cited

U.S. PATENT DOCUMENTS

| | | |
|---|---|---|
| 2008/0205552 A1* | 8/2008 | Sartori et al. ............... 375/316 |
| 2008/0232300 A1 | 9/2008 | McCoy et al. |
| 2008/0235314 A1 | 9/2008 | Lee et al. |
| 2009/0109906 A1* | 4/2009 | Love et al. ................. 370/329 |
| 2009/0270122 A1* | 10/2009 | Chmiel et al. ............. 455/550.1 |
| 2010/0080187 A1* | 4/2010 | Papasakellariou et al. ... 370/329 |
| 2010/0098012 A1* | 4/2010 | Bala et al. ..................... 370/329 |
| 2010/0098139 A1* | 4/2010 | Braithwaite ................. 375/219 |
| 2010/0296410 A1* | 11/2010 | Kazmi et al. ................. 370/252 |
| 2012/0176988 A1* | 7/2012 | Mitra et al. ................... 370/329 |

\* cited by examiner

METHOD FOR PERFORMING WIRELESS COMMUNICATION BETWEEN USER EQUIPMENT AND BASE STATION IN A WIRELESS COMMUNICATION SYSTEM SUPPORTING FIRST USER EQUIPMENT USING SINGLE FREQUENCY BAND AND SECOND USER EQUIPMENT USING MULTIPLE FREQUENCY BANDS

CROSS REFERENCE TO RELATED APPLICATIONS

This application is the National Phase of PCT/KR2010/000016 filed on Jan. 4, 2010, which claims priority under 35 U.S.C. 119(e) to U.S. Provisional Application No. 61/142,372 filed on Jan. 4, 2009 and 61/143,144 filed on Jan. 7, 2009 and under 35 U.S.C. 119(a) to Korean Application No. 10-2009-0128844 filed on Dec. 22, 2009. The entire contents of these applications are hereby incorporated by reference into the present application.

TECHNICAL FIELD

The present invention relates to a method for performing a wireless communication between a User Equipment (UE) and a Base Station (BS) in a wireless communication system supporting a first UE using a single frequency band and a second UE using multiple frequency bands, and more particularly, to a method for reducing a Cubic Metric (CM) value in a multi-carrier communication system.

BACKGROUND ART (1) Physical Channels and Signal Transmission on the Physical Channels in Long Term Evolution (LTE) System FIG. 1 illustrates physical channels and a method for transmitting signals on the physical channels in a mobile communication system, $3^{rd}$ Generation Project Partnership Long Term Evolution (3GPP LTE) known as Evolved Universal Terrestrial Radio Access (E-UTRA, Release 8).

Referring to FIG. 1, upon power on or when entering a new cell, a UE performs initial cell search in step S101. The initial cell search involves acquisition of synchronization to a BS. Specifically, the UE synchronizes its timing to the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (RS).

After the initial cell search, the UE may acquire detailed system information by receiving a Physical Downlink Control CHannel (PDCCH) and receiving a Physical Downlink Shared CHannel (PDSCH) based on the PDCCH in step S102.

If the UE is yet to complete its connection to the BS, the UE may perforin a random access procedure to complete the connection in step S103 to S106. During the random access procedure, the UE may transmit a predetermined sequence as a preamble on a Physical Random Access CHannel (PRACH) in step S103 and receive a response message for the random access on a PDCCH and a PDSCH associated with the PDCCH in step S104. In case of contention-based random access except for handover, the UE may perform a contention resolution procedure by transmitting an additional PRACH in step S105 and receiving a PDCCH and a PDSCH associated with the PDCCH in step S106.

After the above procedures, the UE may receive a PDCCH and/or a PDSCH from the BS in step S107 and transmit a Physical Uplink Shared CHannel (PUSCH) and/or a Physical Uplink Control CHannel (PUCCH) to the BS in step S108, which are a general downlink and uplink signal transmission procedure.

(2) Signaling of Carrier Frequency Band in LTE System

The 3GPP LTE system was designed so as to operate in the frequency bands listed in [Table 1] below. [Table 1] illustrates E-UTRA downlink and uplink frequency bands.

TABLE 1

| E-UTRA Band | Uplink(UL) BS receive UE transmit $F_{UL\_low}$-$F_{UL\_high}$ | Downlink(DL) BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1452.9 MHz | 1475.9 MHz-1500.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| ... | | | |
| 17 | 704 MHz-716 MHz | 734 MHz-746 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |

As noted from [Table 1], when the 3GPP LTE system operates in Frequency Division Duplex (FDD), different downlink and uplink frequency bands are mapped to each other, whereas when the 3GPP LTE system operates in Time Division Duplex (TDD), one frequency band is divided in time for downlink and uplink transmissions. A cell uses a single frequency band in TDD and a pair of frequency bands in FDD. A BS may manage a plurality of cells that are distinguished spatially or by different frequency bands. In [Table 1], the channel raster is 100 KHz, which defines a central frequency that the UE should scan for initial synchronization to the BS. This means that the central frequency of each carrier frequency should be a multiple of 100 KHz. Downlink and uplink carrier frequencies and their bandwidths are signaled as system information in the form of E-UTRA Absolute Radio Frequency Channel Numbers (EARFCNs). In FDD, different downlink and uplink frequency bands are paired and the EARFCN of the uplink frequency band is transmitted to the UE. For handover in an environment where there are a plurality of neighbor cells distinguished by different frequency bands, the EARFCNs of the frequency bands of the cells are broadcast as system information, for handover to the cells.

[Table 2] lists the channel numbers of E-UTRA frequency bands.

TABLE 2

| E-UTRA Band | Downlink | | | Uplink | | |
|---|---|---|---|---|---|---|
| | $F_{DL\_low}$ [MHz] | $N_{Offs-DL}$ | Range of $N_{DL}$ | $F_{UL\_low}$ [MHz] | $N_{Offs-UL}$ | Range of $N_{UL}$ |
| 1 | 2110 | 0 | 0-599 | 1920 | 13000 | 13000-13599 |
| 2 | 1930 | 600 | 600-1199 | 1850 | 13600 | 13600-14199 |
| 3 | 1805 | 1200 | 1200-1949 | 1710 | 14200 | 14200-14949 |
| 4 | 2110 | 1950 | 1950-2399 | 1710 | 14950 | 14950-15399 |
| 5 | 869 | 2400 | 2400-2649 | 824 | 15400 | 15400-15649 |
| 6 | 875 | 2650 | 2650-2749 | 830 | 15650 | 15650-15749 |
| 7 | 2620 | 2750 | 2750-3449 | 2500 | 15750 | 15750-16449 |
| 8 | 925 | 3450 | 3450-3799 | 880 | 16450 | 16450-16799 |
| 9 | 1844.9 | 3800 | 3800-4149 | 1749.9 | 16800 | 16800-17149 |
| 10 | 2110 | 4150 | 4150-4749 | 1710 | 17150 | 17150-17749 |
| 11 | 1475.9 | 4750 | 4750-4999 | 1427.9 | 17750 | 17750-17999 |
| 12 | 728 | 5000 | 5000-5179 | 698 | 18000 | 18000-18179 |
| 13 | 746 | 5180 | 5180-5279 | 777 | 18180 | 18180-18279 |
| 14 | 758 | 5280 | 5280-5379 | 788 | 18280 | 18280-18379 |
| ... | | | | | | |
| 33 | 1900 | 26000 | 26000-26199 | 1900 | 26000 | 26000-26199 |
| 34 | 2010 | 26200 | 26200-26349 | 2010 | 26200 | 26200-26349 |
| 35 | 1850 | 26350 | 26350-26949 | 1850 | 26350 | 26350-26949 |
| 36 | 1930 | 26950 | 26950-27549 | 1930 | 26950 | 26950-27549 |
| 37 | 1910 | 27550 | 27550-27749 | 1910 | 27550 | 27550-27749 |
| 38 | 2570 | 27750 | 27750-28249 | 2570 | 27750 | 27750-28249 |
| 39 | 1880 | 28250 | 28250-28649 | 1880 | 28250 | 28250-28649 |
| 40 | 2300 | 28650 | 28650-29649 | 2300 | 28650 | 28650-29649 |

Referring to [Table 2], a downlink EARFCN and a downlink carrier frequency in MHz satisfy the following equation.

$$F_{DL} = F_{DL\_low} + 0.1(N_{DL} - N_{Offs-DL}) \quad [\text{Equation 1}]$$

where $F_{DL}$ represents the highest frequency of a downlink frequency band, $F_{DL\_low}$ represents the lowest frequency of the downlink frequency band, $N_{offs-DL}$ represents an offset, and $N_{DL}$ represents the downlink EARFCN.

In [Table 2], an uplink EARFCN and an uplink carrier frequency in MHz satisfy the following equation.

$$F_{UL} = F_{UL\_low} + 0.1(N_{UL} - N_{Offs-UL}) \quad [\text{Equation 2}]$$

where $F_{UL}$ represents the highest frequency of an uplink frequency band, $F_{UL\_low}$ represents the lowest frequency of the uplink frequency band, $N_{offs-UL}$ represents an offset, and $N_{UL}$ represents the uplink EARFCN.

FIG. 2 illustrates an LTE system using a single component carrier. Referring to FIG. 2, transmission and reception each are performed in one frequency band in the LTE system. If transmission and reception are intended in neighbor frequency bands, inter-frequency handover is performed to thereby change the carrier frequency.

FIG. 3 illustrates a multi-carrier system. In the multi-carrier system, a UE may receive a plurality of component carriers simultaneously. When component carriers are contiguous as illustrated in FIG. 3, the entire component carriers may be subjected to Fast Fourier Transform (FFT) and then the FFT signal may be amplified by a power amplifier, for Orthogonal Frequency Division Multiplexing (OFDM) transmission. If the same pattern of downlink Reference Signals (RSs) is used for every component carrier, a CM value that affects the backoff of the power amplifier increases.

[Table 3] below lists CM measurements when downlink RSs are transmitted in the same pattern in every component carrier.

TABLE 3

| w/o PSF QPSK | | | CM OFDM | | | | |
|---|---|---|---|---|---|---|---|
| | | | #F-Block | | | | |
| | | | 1 | 2 | 3 | 4 | 5 |
| RS only | 1Tx | | 4.02 | 6.57 | 8.59 | 10.13 | 11.32 |
| | Rank1 | ANT1 | 4.02 | 6.52 | 8.58 | 10.13 | 11.32 |
| | | ANT2 | 3.98 | 6.56 | 8.59 | 10.11 | 11.34 |
| | 2Tx | ANT1 | 3.98 | 6.52 | 8.59 | 10.15 | 11.35 |
| | Rank2 | ANT2 | 3.98 | 6.52 | 8.61 | 10.13 | 11.35 |
| RS(0 dB) + data | 1Tx | | 4.02 | 4.12 | 4.27 | 4.42 | 4.58 |
| | Rank1 | ANT1 | 3.99 | 4.17 | 4.37 | 4.60 | 4.82 |
| | | ANT2 | 3.99 | 4.17 | 4.37 | 4.59 | 4.82 |
| | 2Tx | ANT1 | 4.00 | 4.17 | 4.38 | 4.58 | 4.81 |
| | Rank2 | ANT2 | 4.01 | 4.16 | 4.37 | 4.57 | 4.82 |
| RS(3 dB) boost) + data | 1Tx | | 4.00 | 4.32 | 4.73 | 5.12 | 5.52 |
| | Rank1 | ANT1 | 4.00 | 4.43 | 4.94 | 5.45 | 5.95 |
| | | ANT2 | 4.00 | 4.44 | 4.96 | 5.44 | 5.95 |
| | 2Tx | ANT1 | 4.00 | 4.43 | 4.93 | 5.44 | 5.95 |
| | Rank2 | ANT2 | 4.00 | 4.44 | 4.95 | 5.46 | 5.95 |
| RS(6 dB) boost) + data | 1Tx | | 4.00 | 4.72 | 5.54 | 6.28 | 6.97 |
| | Rank1 | ANT1 | 4.00 | 4.89 | 5.86 | 6.71 | 7.50 |
| | | ANT2 | 3.99 | 4.88 | 5.84 | 6.72 | 7.51 |
| | 2Tx | ANT1 | 4.02 | 4.88 | 5.84 | 6.71 | 7.50 |
| | Rank2 | ANT2 | 4.01 | 4.88 | 5.85 | 6.73 | 7.48 |
| RS(9 dB) boost) + data | 1Tx | | 4.01 | 5.25 | 6.52 | 7.58 | 8.50 |
| | Rank1 | ANT1 | 4.00 | 5.42 | 6.79 | 7.95 | 8.92 |
| | | ANT2 | 4.00 | 5.41 | 6.81 | 7.96 | 8.93 |
| | 2Tx | ANT1 | 4.02 | 5.41 | 6.79 | 7.98 | 8.91 |
| | Rank2 | ANT2 | 3.99 | 5.43 | 6.79 | 7.95 | 8.93 |

Referring to [Table 3], it is revealed that while in case of transmitting an RS and data at the same power ratio, an increase of component carriers in number leads to a negligibly small CM increase, the CM increases significantly due to the increase of component carriers in number, when RS power is boosted. Accordingly, there exists a need for minimizing a CM increase in a multi-carrier system.

DISCLOSURE

Technical Problem

An object of the present invention devised to solve the problem lies on a method for performing a communication between a UE and a BS without increasing a CM value in applying a downlink Reference Signal (RS) pattern to multiple carriers in a multi-carrier wireless communication system.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

The object of the present invention can be achieved by providing a method for performing a wireless communication between a User Equipment (UE) and a Base Station (BS) in a wireless communication system supporting a first UE using a single frequency band and a second UE using a plurality of frequency bands, to each of which Orthogonal Frequency Division Multiplexing (OFDM) is applied, the method including being allocated one or more downlink component carriers for the second UE from the BS; and receiving the one or more downlink component carriers from the BS by the second UE. The one or more downlink component carriers are cyclically shifted by different cyclic shift values and the cyclic shifting is performed by multiplying each of the one or more downlink component carriers by a linear phase having a different inclination. Preferably, a specific frequency selected from each of the one or more downlink component carriers may be a reference for a start point to which the linear phase having a different inclination may be applied.

Preferably, the reference may be a first subcarrier of each of the one or more downlink component carriers. Preferably, the reference may be a Direct Current (DC) subcarrier of each of the one or more downlink component carriers.

Preferably, a specific frequency selected from among all of the one or more downlink component carriers may be a reference for a start point to which the linear phase having a different inclination may be applied.

Preferably, a specific frequency selected from each of the one or more downlink component carriers may be a reference for a start point to which the linear phase having a different inclination is applied, and a predetermined offset being a phase shift value may be applied to the reference during the cyclic shifting.

Preferably, the method may further include receiving the cyclic shift values that are broadcast, by the second UE.

Preferably, the same cell Identifier (ID) may be applied to the one or more downlink component carriers.

In another aspect of the present invention, provided herein a method for performing a wireless communication between a User Equipment (UE) and a Base Station (BS) in a wireless communication system supporting a first UE using a single frequency band and a second UE using a plurality of frequency bands, to each of which Orthogonal Frequency Division Multiplexing (OFDM) is applied, the method including transmitting one or more downlink component carriers to the second UE by the BS. The one or more downlink component carriers are cyclically shifted by different cyclic shift values and the cyclic shifting is performed by multiplying each of the one or more downlink component carriers by a linear phase having a different inclination.

Preferably, a specific frequency selected from each of the one or more downlink component carriers may be a reference for a start point to which the linear phase having a different inclination may be applied.

Preferably, the reference may be a first subcarrier of each of the one or more downlink component carriers. Preferably, the reference may be a Direct Current (DC) subcarrier of each of the one or more downlink component carriers.

Preferably, a specific frequency selected from among all of the one or more downlink component carriers may be a reference for a start point to which the linear phase having a different inclination may be applied.

Preferably, a specific frequency selected from each of the one or more downlink component carriers is a reference for a start point to which the linear phase having a different inclination is applied, and a predetermined offset being a phase shift value is applied to the reference during the cyclic shifting.

Preferably, the method may further include broadcasting the cyclic shift values by the BS.

Preferably, the same cell Identifier (ID) may be applied to the one or more downlink component carriers.

Advantageous Effects

According to the present invention, since different cyclic shift values are applied to a plurality of CCs, a CM increase can be prevented, which might otherwise be caused by the use of the same downlink RS pattern in the plurality of CCs, in a multi-carrier system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following description includes specific details in order to provide a thorough understanding of the present invention. However, it will be apparent to those skilled in the art that the present invention may be practiced without such specific details. For example, while the following description is made, centering on specific terms, the present invention is not limited to the specific terms. Even though the specific terms are replaced with arbitrary terms, they may mean the same. Like reference numbers will be used throughout this specification to refer to the same or like parts. A system and a User Equipment (UE) according to the present invention are distinguished from a legacy system and a UE operating in the legacy system.

Figure 1:
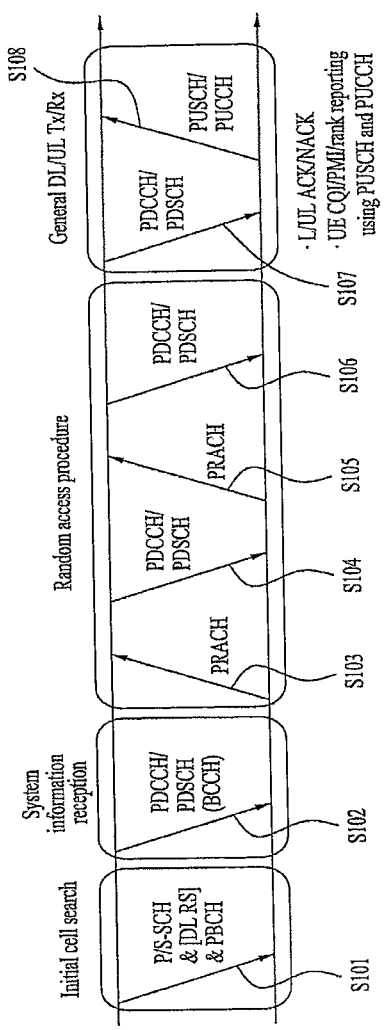
FIG. 1 illustrates physical channels and a method for transmitting signals on the physical channels in a mobile communication system, 3$^{rd}$ Generation Project Partnership Long Term Evolution (3GPP LTE).
Figure 2:
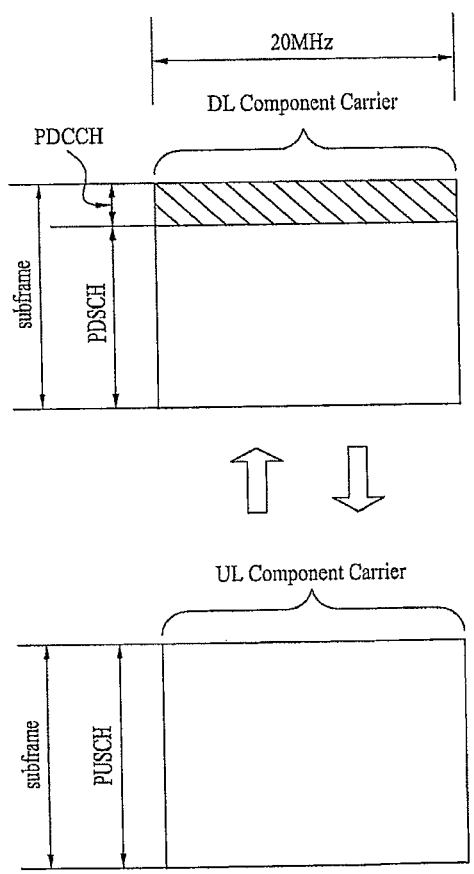
FIG. 2 illustrates an LTE system using a single component carrier.
Figure 3:
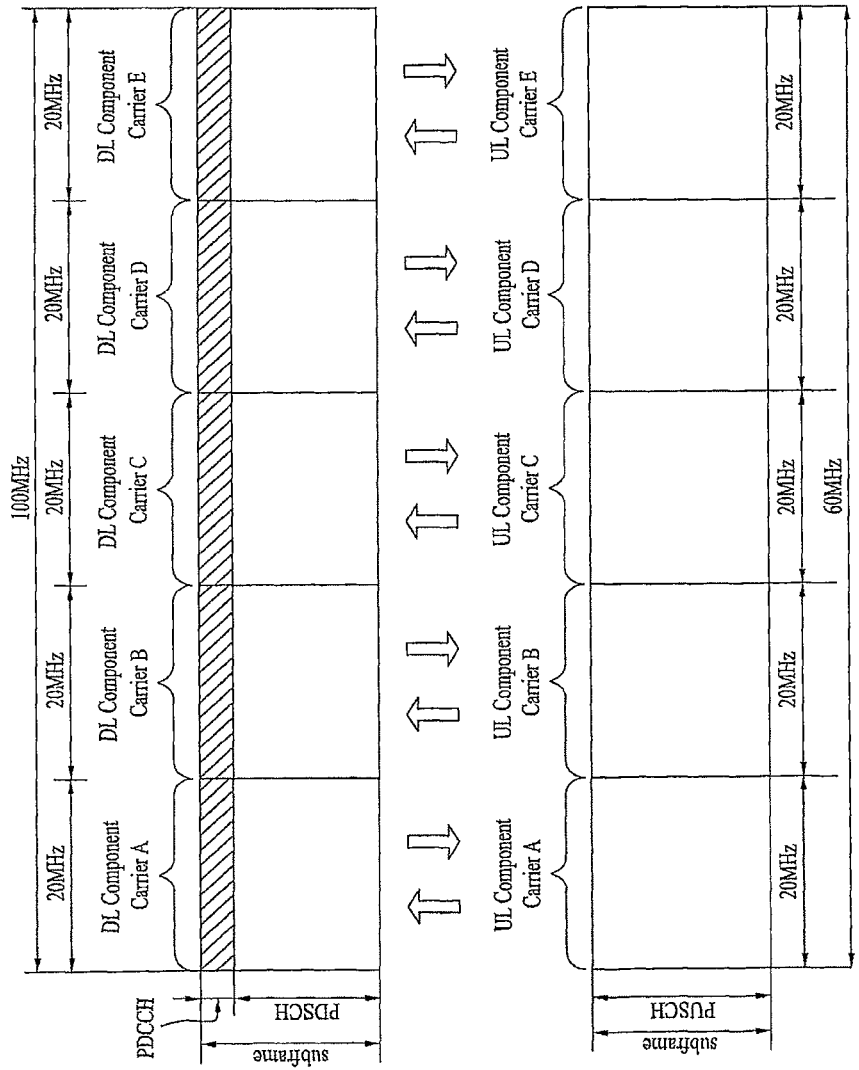
FIG. 3 illustrates an LTE-Advanced (LTE-A) system using multiple carriers.
Figure 4:
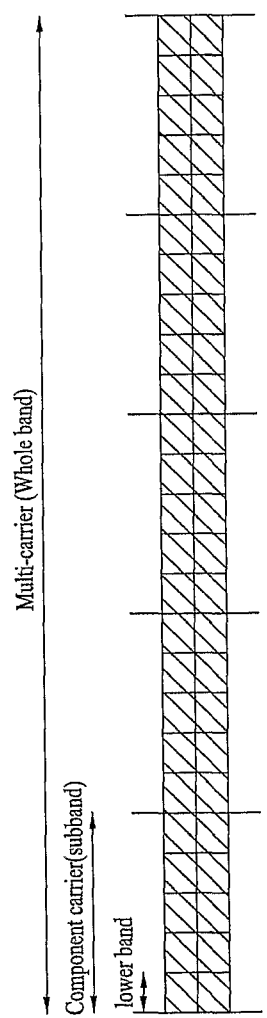
FIG. 4 illustrates a frequency band in a multi-carrier system.

A concept of multi-carrier and Component Carrier (CC) will first be described below. FIG. 4 illustrates a frequency band in a multi-carrier system. Referring to FIG. 4, the multi-carrier represents a total frequency band available to a Base Station (BS), equivalent to a whole band in its meaning. For example, the multi-carrier may be 100 MHz.

A CC is an element of the multi-carrier. That is, a plurality of CCs forms the multi-carrier by carrier aggregation. The CC includes a plurality of lower bands. If a multi-carrier is called a whole band, a CC may be referred to as a subband and a lower band may be referred to as a partial band. Carrier aggregation is intended to extend a bandwidth by aggregating a plurality of carriers in order to increase data rate. For example, the legacy system uses a carrier of 20 MHz and the bandwidth of the carrier may be extended up to 100 MHz by aggregating five 20-MHz carriers. The term 'carrier aggregation' covers a case of aggregating carriers in different frequency bands.

The legacy system defines one frequency band for one cell. Hence, cells may be distinguished by cell Identifiers (IDs). A unique global cell ID, and a Physical Cell ID (PCI) for cell identification based on physical layer characteristics may be allocated to each cell. In LTE, 504 PCIs are available. These PCIs are applied to uplink functions which may, for example, include downlink Reference Signal (RS) sequence, Physical Uplink Shared CHannel (PUSCH) hopping, Physical Uplink Control CHannel (PUCCH) RS sequence, and RS group hopping.

A PUSCH is divided into a plurality of subbands. When hopping is applied to the subbands, data is transmitted in changing subbands over one or more hops. In the case where the indexes of contiguous Virtual Resource Blocks (VRBs) are allocated to a UE, if hopping is not used, the UE transmits data in Physical Resource Blocks (PRBs) onto which the VRBs are directly mapped, whereas if hopping is used, the UE transmits data in PRBs onto which the VRBs are mapped according to a predetermined hopping pattern. A PCI is used for generating the hopping pattern, and a hopping pattern changes with a PCI.

In addition, a PCI is used for a PUCCH RS sequence and RS group hopping, as stated before. Different PUCCH RS sequences and different RS group hopping patterns are created according to different PCIs.

Now a description will be made of a method for preventing repetition of the same downlink RS pattern from increasing a Cubic Metric (CM) in a multi-carrier system according to the present invention.

Embodiment 1

In an exemplary embodiment of the present invention, a CM increase is prevented by allocating the same cell ID to downlink CCs and applying different time delay to each of the downlink CCs.

When the same cell ID is shared among all downlink CCs and backward compatibility with the legacy system is maintained in a multi-carrier system of the present invention, iteration of the same downlink RS pattern in every downlink CC may increase a CM. To minimize the CM increase, while ensuring backward compatibility, a different time delay may be applied to each downlink CC in this exemplary embodiment.

N discrete complex values $x_0, x_1, x_2, \ldots, x_{N-1}$ are converted to complex values $X_0, X_1, X_2, \ldots, X_{N-1}$ by Discrete Fourier Transform (DFT) expressed as [Equation 3].

$$X_k = \sum_{n=0}^{N-1} x_n e^{-\frac{2\pi i}{N}kn}, k = 0, \ldots, N-1 \quad \text{[Equation 3]}$$

where i represents an imaginary unit and $$e^{\frac{2\pi i}{N}}$$

represents a primitive $N^{th}$ root of unity.

Inverse Discrete Fourier Transform (IDFT) is defined as $$x_n = \frac{1}{N}\sum_{n=0}^{N-1} x_n e^{\frac{2\pi i}{N}kn}, n = 0, \ldots, N-1 \quad \text{[Equation 4]}$$

The legacy system adopts OFDM as a multi-carrier transmission scheme for each CC. Because subcarriers are converted to time samples by IDFT in OFDM, modulation symbols transmitted on the entire subcarriers may be represented as $X_k$ and the time samples may be represented as $x_n$. A first time sample is given as $$x_0 = \sum_{k}^{N-1} X_k,$$

which reveals that modulation symbol values on the subcarriers are summed without a phase change. Therefore, if $X_k$ has an iterative pattern due to transmission of RSs in a plurality of downlink CCs, a CM value may be increased due to signal overlapping.

Figure 5:
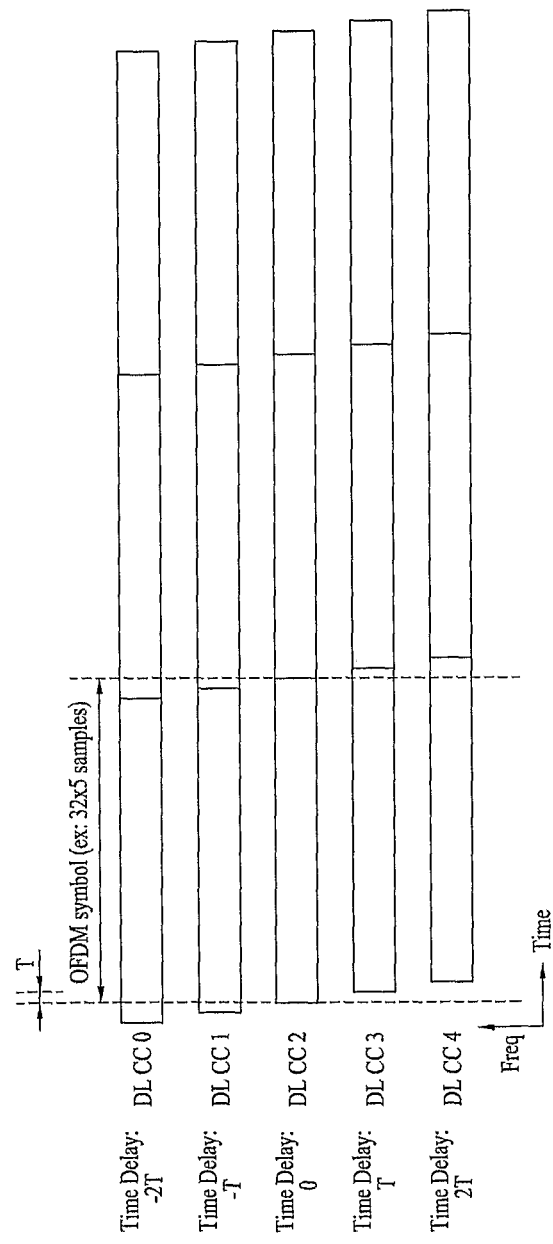
FIG. 5 illustrates a method for applying different time delays to downlink Component Carriers (CCs) according to an exemplary embodiment of the present invention.

FIG. 5 illustrates the result of applying different time delays to downlink CCs according to an exemplary embodiment of the present invention. Referring to FIG. 5, signal overlapping is avoided by applying different time delay to each downlink CC. A time delay may be a multiple of the inverse of a sample rate. In case of oversampling, the time delay is a multiple of the inverse of an oversample rate. Different time delays are set for all or part of aggregated CCs. To allow a UE to get knowledge of different time delays of CCs that it receives and thus to acquire synchronization to the CCs or perform accurate channel estimation on the CCs, the time delays may be broadcast.

Embodiment 2

In another exemplary embodiment of the present invention, a CM increase is prevented by cyclically shifting each downlink CC in time axis.

Data symbols carried on subcarriers are converted to a time signal by IDFT on an OFDM symbol unit. Therefore, the above-described method for applying time delays in sample unit requires IDFT processing on individual CC and applying time delay to the time signal. Also, the applying the time delay to individual CCs causes mismatch between OFDM symbol boundaries in the CCs.

An IDFT of the product between the frequency signal $X_k$ and a linear phase $$e^{-\frac{j2\pi}{N}nm}$$

for an integer m is equivalent to a cyclic shift of the time signal $x_n$. That is, $$\text{If } F(\{x_n\})_k = X_k \text{ then } F(\{x_{n-m}\})_k = X_k \cdot e^{-\frac{j2\pi}{N}nm} \quad \text{[Equation 5]}$$

where subscript represents a modulo operation and $\{x_n\}$ is a vector X.

Figure 6:
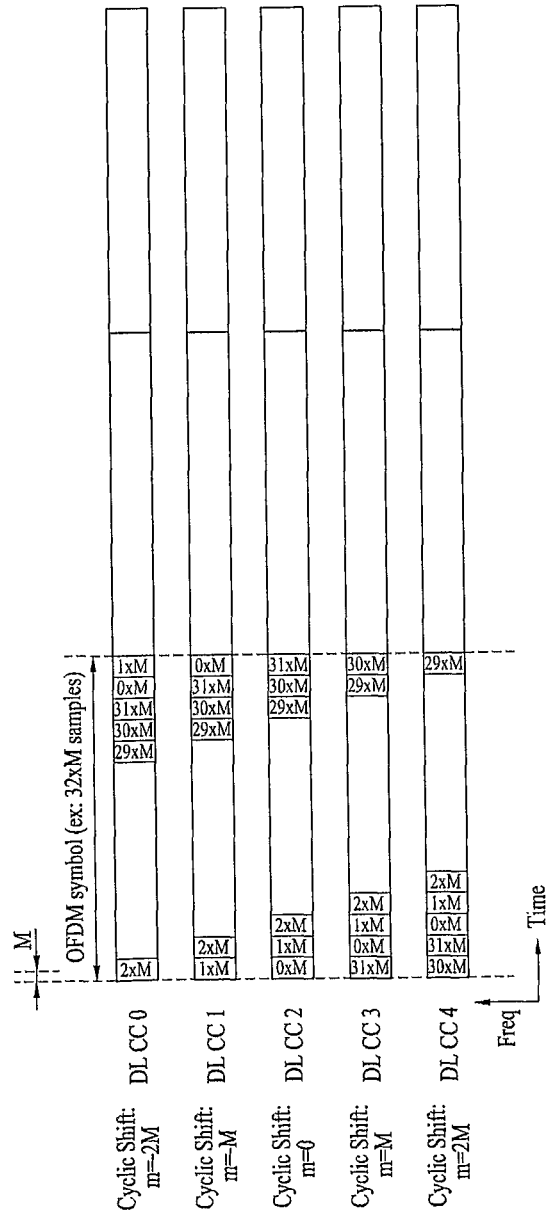
FIG. 6 illustrates a method for cyclically shifting downlink CCs by different shift values according to an exemplary embodiment of the present invention.

FIG. 6 illustrates the result of cyclically shifting downlink CCs by different shift values according to an exemplary embodiment of the present invention. Referring to FIG. 6, different cyclic shifts are applied to each of the CCs in order to apply a different time delay to each of the CCs in time axis and match OFDM symbol boundaries among the CCs. A cyclic shift value may be an arbitrary integer, preferably a multiple of the total number of CCs. Different cyclic shift values may be set for all or part of aggregated CCs. The cyclic shift values may be broadcast so that a UE may acquire synchronization to CCs or accurately perform channel estimation on the CCs based on the cyclic shift values of the CCs that it receives.

In the illustrated case of FIG. 6, a first downlink CC, DL CC 0 is cyclically shifted from a third downlink CC, DL CC 2 by −2M, a second downlink CC, DL CC 1 is cyclically shifted from the third downlink CC, DL CC 2 by −M, a fourth downlink CC, DL CC 3 is cyclically shifted from the third downlink CC, DL CC 2 by M, and a fifth downlink CC, DL CC 4 is cyclically shifted from the third downlink CC, DL CC 2 by 2M. M is the difference between the numbers of cyclically shifted samples of adjacent CCs. M may be an arbitrary integer. Compared to FIG. 5, a time delay T may be expressed as [Equation 6].

$$T=M \times (\text{sampling period}) \quad \text{[Equation 6]}$$

Since the boundaries of OFDM symbols are aligned in the downlink CCs, data carried on each subcarrier may be cyclically shifted by multiplying the data with a linear phase, in the frequency domain, corresponding to a cyclic shift value m set on a CC basis. Thus modulation symbols allocated to the subcarriers of the entire downlink CCs may be converted to time signals by one IDFT process.

Hereinbelow, methods for applying a linear phase in frequency corresponding to a cyclic shift in time will be described.

One of the methods is to increase a linear phase with respect to a predetermined frequency (e.g. subcarrier) in each CC. Specifically, a subcarrier is selected as a reference in each CC and subcarriers are multiplied by linear phases relative to the reference.

Figure 7:
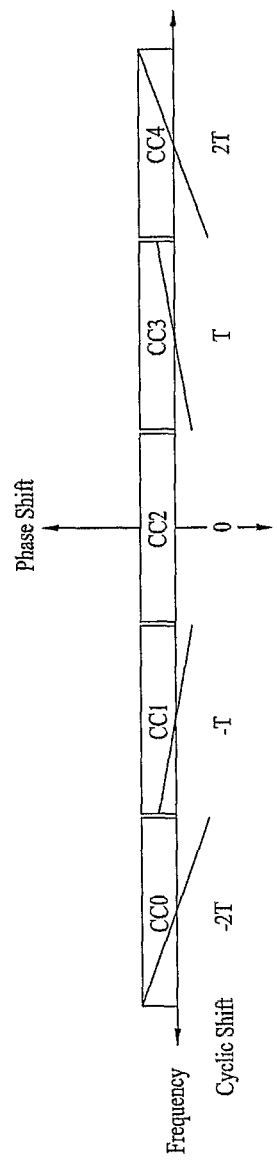
FIG. 7 illustrates a method for increasing a linear phase using a predetermined frequency as a reference in each downlink CC according to an exemplary embodiment of the present invention.

FIG. 7 illustrates an example of increasing a linear phase using a predetermined frequency as a reference in each CC. In FIG. 7, a specific Direct Current (DC) subcarrier is designated as a reference in each CC. In another example, a subcarrier of the highest or lowest frequency may be designated as a reference in each CC. If subcarriers are indexed in an ascending order of frequency, the subcarrier of the lowest or highest frequency is the subcarrier with the first or last index. The inclination of a linear phase for each CC varies according to a cyclic shift value set for the CC.

Another method for applying a linear phase in frequency corresponding to a cyclic shift in time is to increase a linear phase with respect to a frequency (e.g. a DC subcarrier) selected from among the total frequency bands of all CCs as a reference.

Figure 8:
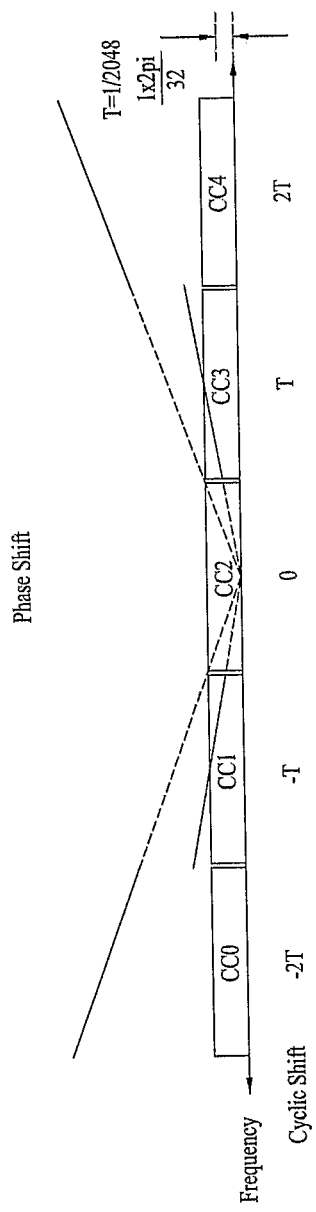
FIG. 8 illustrates a method for increasing a linear phase using a frequency selected from among the frequency bands of all downlink CCs as a reference according to an exemplary embodiment of the present invention.

FIG. 8 illustrates an example of increasing a linear phase using a frequency selected from among the frequency bands of all CCs as a reference. In FIG. 8, a specific DC subcarrier selected from among the frequency bands of the entire CCs is designated as a reference. In another example, a subcarrier of the highest or lowest frequency of the total frequency band may be designated as a reference. One specific subcarrier is set as a reference among the frequency bands of the entire CCs and subcarriers are multiplied by linear phases relative to the reference. The inclination of a linear phase for each CC varies according to a cyclic shift value set for the CC.

Figure 9:
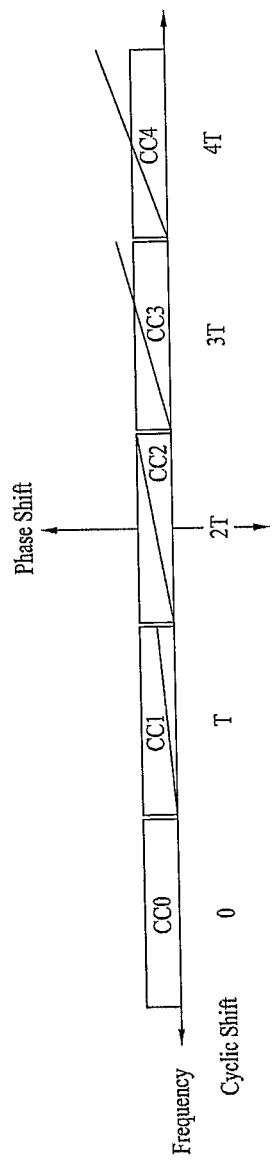
FIG. 9 illustrates a method for increasing a linear phase using a predetermined frequency as a reference in each downlink CC according to another exemplary embodiment of the present invention.

FIG. 9 illustrates another example of increasing a linear phase using a predetermined frequency as a reference in each CC. This is an example of the first method, in which the first subcarrier of each CC is designated as a reference for setting linear phases.

A linear phase for an $i^{th}$ CC is expressed as a complex value by $$P_i^{linear}(k)=\exp(-j \cdot 2\pi \cdot (k-k_i)T_i) \quad \text{[Equation 7]}$$

where $k_i$ is the index of a subcarrier used as a reference for setting linear phases in the $i^{th}$ CC. In FIG. 9, the first subcarrier index of the $i^{th}$ CC is $k_i$.

Figure 10:
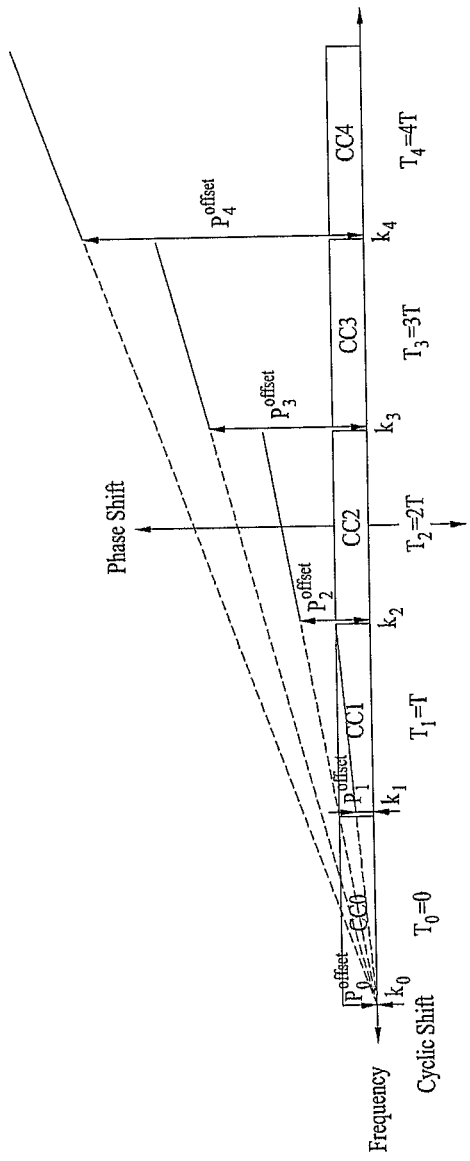
FIG. 10 illustrates a method for increasing a linear phase using a frequency selected from among the frequency bands of all downlink CCs as a reference according to another exemplary embodiment of the present invention.

FIG. 10 illustrates another example of increasing a linear phase using a frequency selected from among the frequency bands of entire CCs as a reference. This is an example of the second method, in which the first subcarrier of the first CC among the entire CCs is designated as a reference for setting linear phases.

A linear phase for an $i^{th}$ CC is expressed as a complex value by $$P_i^{linear}(k)=\exp(j\cdot 2\pi\cdot(k-k_{ref})T_i)=\exp(2\pi\cdot(k-k_i)T_i)\cdot P_i^{offset} \quad [\text{Equation 8}]$$

where $P_i^{offset}=\exp(j\cdot 2\pi\cdot(k_i-k_{ref})T_i)$ and $k_{ref}$ is the index of a subcarrier used as a common reference for setting linear phases for all CCs. In FIG. 10, $k_{ref}=k_0$ is satisfied.

Regarding to the first and second methods, it is to be understood that methods for designating a reference for linear phases are not limited to the above-described exemplary embodiments and thus a reference may be set in many other ways.

[Table 4] below compares a case of applying different cyclic shift values to a plurality of CCs with a case of not applying different cyclic shift values to the plurality of CCs, in terms of CM values, when RSs are transmitted in the plurality of CCs according to the same pattern. In [Table 4], an IDFT size is 2048×8 and cyclic shift values for five CCs are 0, 5, 10, 15 and 20 samples, respectively.

TABLE 4

| w/o PSF | | CM OFDM | | | | |
|---------|---|---|---|---|---|---|
| QPSK | #CC | 1 | 2 | 3 | 4 | 5 |
| RS only | 1Tx (w/o cyclic Shift) | 4.01 | 6.57 | 8.59 | 10.13 | 11.32 |
| | 1Tx (w/ cyclic Shift) (first method) | 4.01 | 4.95 | 5.48 | 5.78 | 5.95 |
| | 1Tx (w/ cyclic Shift) (second method) | 4.01 | 4.95 | 5.08 | 4.71 | 4.25 |

As noted from [Table 4], when RSs are transmitted in the same pattern in a plurality of CCs, the use of different cyclic shift values for the CCs reduces a CM increase considerably. It is also revealed that the second method performs better than the first method.

The above-described present invention is applicable to the following seven cases:
1) Only to downlink RSs;
2) Only to a synchronization signal;
3) Only to downlink RSs and a synchronization signal;
4) to downlink RSs, a synchronization signal, and all of down link CCs of a PDSCH and a PDCCH;
5) to downlink RSs and all of down link CCs of a PDSCH and a PDCCH, except for a synchronization signal;
6) only to downlink RSs and a PDSCH; and
7) only to a PDSCH and a PDCCH.

Figure 11:
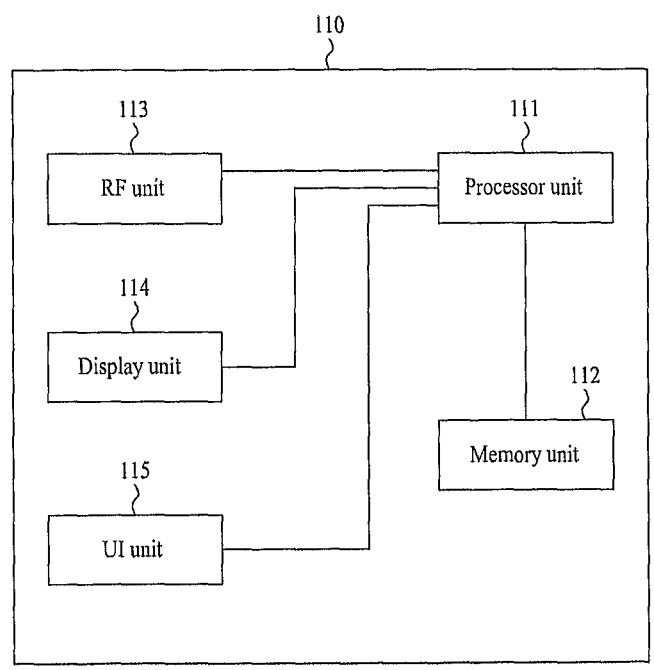
FIG. 11 is a block diagram of an apparatus which is applicable to a User Equipment (UE) or a Base Station (BS), for performing the above exemplary embodiments of the present invention, according to an exemplary embodiment of the present invention.

FIG. 11 is a block diagram of an apparatus which is applicable to a UE or a BS, for performing the above exemplary embodiments of the present invention, according to an exemplary embodiment of the present invention.

Referring to FIG. 11, an apparatus 110 includes a processor unit 111, a memory unit 112, a Radio Frequency (RF) unit 113, a display unit 114, and a User Interface (UI) unit 115. The processor unit 111 takes charge of physical interface protocol layers and provides a control plane and a user plane. The processor unit 111 may also perform the functionalities of each layer. The memory unit 112 is electrically connected to the processor unit 111 and stores an operating system, application programs, and general files. If the apparatus 110 is a UE, the display unit 114 may display a variety of information and may be implemented with a known Liquid Crystal Display (LCD), an Organic Light Emitting Diode (OLED), or the like. The UI unit 115 may be configured in combination with a known UI like a keypad, a touch screen, etc. The RF unit 113 is electrically connected to the processor unit 131, for transmitting and receiving RF signals.

MODE FOR INVENTION

Various embodiments have been described in the best mode for carrying out the invention.

INDUSTRIAL APPLICABILITY

The present invention is applicable to a UE, a BS or any other device in a wireless mobile communication system.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

The exemplary embodiments of the present invention may be achieved by various means, for example, hardware, firmware, software, or a combination thereof. In a hardware configuration, the methods according to the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:
1. A method for performing a wireless communication between a first User Equipment (UE) and a Base Station (BS) in a wireless communication system supporting carrier aggregation, the method comprising:

receiving, by the first UE from the BS, a resource allocation through one of multiple downlink component carriers; and receiving signals through the downlink component carriers from the BS by the first UE based on the resource allocation, wherein the signals received through each of the downlink component carriers are cyclically shifted by different cyclic shift values, wherein a specific frequency selected from each of one or more of the downlink component carriers is a reference for a start point to which a linear phase having a different phase angle is applied, wherein the reference is a Direct Current (DC) subcarrier of each of the one or more of the downlink component carriers, wherein each of the downlink component carriers comprises a plurality of resource blocks and has a respective bandwidth for serving a legacy UE not supporting carrier aggregation, wherein each cell uses a respective single downlink component carrier, and wherein a common physical cell identifier (ID) is used within multiple cells respectively corresponding to the multiple downlink component carriers.

2. The method according to claim 1, wherein the specific frequency is selected from among all of the one or more of the downlink component carriers.

3. The method according to claim 1, wherein a predetermined offset is a phase shift value applied to the reference during the cyclic shifting.

4. The method according to claim 1, further comprising:
receiving, by the first UE, the cyclic shift values that are broadcast.

5. A method for performing a wireless communication between a first User Equipment (UE) and a Base Station (BS) in a wireless communication system supporting carrier aggregation, the method comprising:

transmitting, to the first UE from the BS, a resource allocation through one of multiple downlink component carriers; and transmitting signals through the downlink component carriers to the first UE by the BS, wherein the signals transmitted through each of the downlink component carriers are cyclically shifted by different cyclic shift values, wherein a specific frequency selected from each of one or more of the downlink component carriers is a reference for a start point to which a linear phase having a different phase angle is applied, wherein the reference is a Direct Current (DC) subcarrier of each of the one or more of the downlink component carriers wherein each of the downlink component carriers comprises a plurality of resource blocks and has a respective bandwidth for serving a legacy UE not supporting carrier aggregation, wherein each cell uses a respective single downlink component carrier, and wherein a common physical cell identifier (ID) is used within multiple cells respectively corresponding to the multiple downlink component carriers.

6. The method according to claim 5, wherein the specific frequency is selected from among all of the one or more of the downlink component carriers.

7. The method according to claim 5, wherein a predetermined offset is a phase shift value applied to the reference during the cyclic shifting.

8. The method according to claim 5, further comprising broadcasting the cyclic shift values by the BS.

* * * * *